United States Patent
Mitsugi

(10) Patent No.: US 10,620,773 B2
(45) Date of Patent: Apr. 14, 2020

(54) DISPLAY CONTROL APPARATUS AND DISPLAY CONTROL METHOD

(71) Applicant: MITSUBISHI ELECTRIC CORPORATION, Tokyo (JP)

(72) Inventor: Tatsuya Mitsugi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/564,247

(22) PCT Filed: Aug. 31, 2015

(86) PCT No.: PCT/JP2015/074568
§ 371 (c)(1),
(2) Date: Oct. 4, 2017

(87) PCT Pub. No.: WO2017/037814
PCT Pub. Date: Mar. 9, 2017

(65) Prior Publication Data
US 2018/0129358 A1    May 10, 2018

(51) Int. Cl.
*G06F 3/0481* (2013.01)
*G06F 3/14* (2006.01)
*G06F 9/50* (2006.01)

(52) U.S. Cl.
CPC ............ *G06F 3/0481* (2013.01); *G06F 3/14* (2013.01); *G06F 9/50* (2013.01)

(58) Field of Classification Search
CPC ............ G06F 3/0481; G06F 3/14; G06F 9/50
See application file for complete search history.

(56) References Cited

U.S. PATENT DOCUMENTS 9,134,756 B2 *   9/2015   de Paz ................. G06F 1/1616
2010/0293504 A1   11/2010   Hachiya
(Continued)

FOREIGN PATENT DOCUMENTS

JP   2006-350755 A   12/2006
JP   2010-267142 A   11/2010
(Continued)

OTHER PUBLICATIONS

Office Action dated May 8, 2018 in counterpart Japanese Application No. 2017-537080 with an English Translation.
(Continued)

*Primary Examiner* — Roland J Casillas
(74) *Attorney, Agent, or Firm* — Birch, Stewart, Kolasch & Birch, LLP

(57) ABSTRACT

The present invention has an object of implementing a multi-window using an OS for smartphones that does not support multi-display. The display control apparatus according to the present invention is a display control apparatus using an operating system for smartphones, and includes: a window creator that creates a window for each of displays; a window allocator that allocates the windows to a plurality of applications; and a display controller that obtains respective display information items from the plurality of applications, and causes the displays to display the display information items according to the allocation of the windows, the displays corresponding to the respective windows. The plurality of applications include first applications defined by a specification of the operating system as applications for controlling display, and second applications defined by the specification as applications for not controlling display.

3 Claims, 21 Drawing Sheets

(56) References Cited

U.S. PATENT DOCUMENTS

| | | | |
|---|---|---|---|
| 2013/0024812 A1* | 1/2013 | Reeves | G06F 3/1423 |
| | | | 715/810 |
| 2013/0305184 A1* | 11/2013 | Kim | G06F 3/0481 |
| | | | 715/781 |
| 2014/0310643 A1 | 10/2014 | Karmanenko et al. | |

FOREIGN PATENT DOCUMENTS

| | | |
|---|---|---|
| JP | 4676011 B2 | 4/2011 |
| JP | 2014-503891 A | 2/2014 |
| JP | 2014-149699 A | 8/2014 |
| WO | WO 2012/078079 A2 | 6/2012 |

OTHER PUBLICATIONS

Juggly, juggly.cn, Ixonos, Android Tanmatsu o Multi Window-ka, Multi Monitor-ka suru Software no Demo o Hiro, [online], Sep. 25, 2013, [retrieval date Nov. 9, 2015], Internet: <URL: http://juggly.cn/archives/95639.html>, 2 pages.

Kseto, TechBooster, Android Gamen-jo ni Apuri no Joho o Joji Hyoji suru Hobo, [online], Feb. 5, 2012, [retrieval date Nov. 9, 2015], Internet: <URL: http://techbooster.org/android/ui/13182/>, 7 pages.

\* cited by examiner

F I G. 2 1
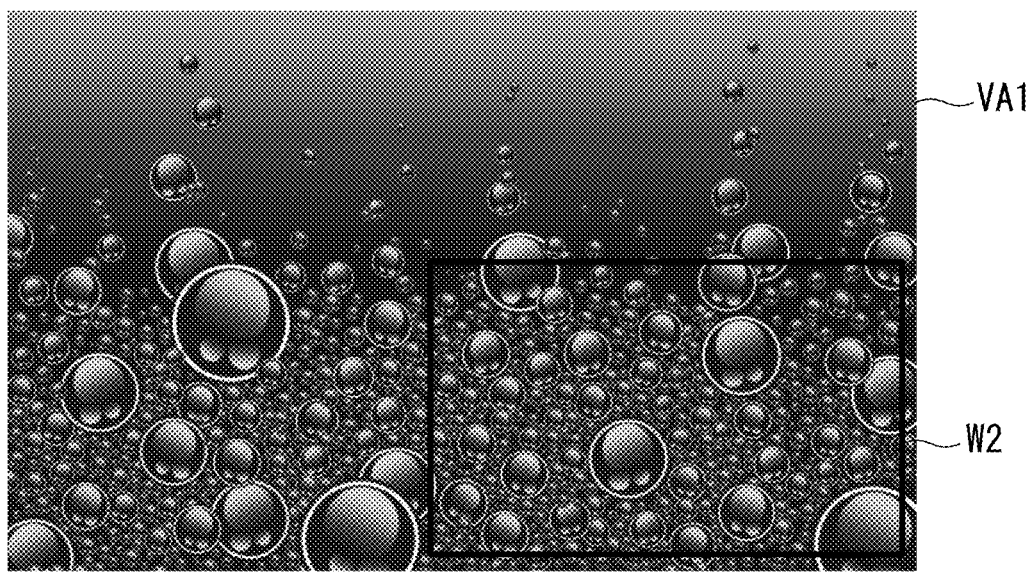
F I G. 2 2
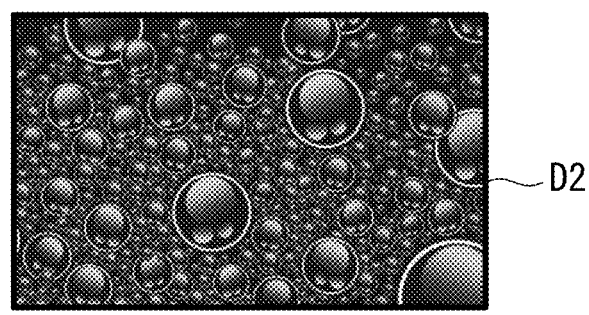

DISPLAY CONTROL APPARATUS AND DISPLAY CONTROL METHOD

TECHNICAL FIELD

The present invention relates to a display control apparatus and a display control method for implementing multi-display.

BACKGROUND ART

Multi-display systems for displaying a plurality of windows (a multi-window) of a plurality of different applications (a multi-application) on a plurality of displays have conventionally been known. For example, Patent Document 1 discloses a system that displays a window for displaying, on a built-in monitor, details displayed on an external monitor upon detection of disconnection of the external monitor during use of an extended desktop function, which enables prevention of a non-operable state.

PRIOR-ART DOCUMENTS

Patent Documents

Patent Document 1: Japanese Patent Application Laid-Open No. 2006-350755

SUMMARY

Problems to be Solved by the Invention

However, operating systems (OSs) for smartphones typically do not support multi-display. Such OSs have a problem with not being able to implement multi-display when used.

In view of the problem, the present invention has an object of implementing multi-display using an OS for smartphones that does not support multi-display.

Means to Solve the Problems

The display control apparatus according to the present invention is a display control apparatus using an operating system for smartphones, and includes: a window creator that creates, for each of displays, a window that is a display area; a window allocator that allocates, to a plurality of applications, the windows created by the window creator; and a display controller that obtains respective display information items from the plurality of applications, and causes the displays to display the display information items according to the allocation of the windows. The plurality of applications include first applications defined by a specification of the operating system as applications for controlling display, and second applications defined by the specification of the operating system as applications for not controlling display. The window allocator can allocate only one window to at least the first application that does not mainly operate among the first applications.

Effects of the Invention

The display control apparatus according to the present invention is a display control apparatus using an operating system for smartphones, and includes: a window creator that creates, for each of displays, a window that is a display area; a window allocator that allocates, to a plurality of applications, the windows created by the window creator; and a display controller that obtains respective display information items from the plurality of applications, and causes the displays to display the display information items according to the allocation of the windows. The plurality of applications include first applications defined by a specification of the operating system as applications for controlling display, and second applications defined by the specification of the operating system as applications for not controlling display. The window allocator can allocate only one window to at least the first application that does not mainly operate among the first applications. Thus, multi-display can be implemented using the OS for smartphones that does not support the multi-display.

The objects, features, aspects and advantages of the present invention will become more apparent from the following detailed description and the accompanying drawings.

BRIEF DESCRIPTION OF DRAWINGS

FIG. 21 illustrates a state of clipping the display information item of the activity application by the window.

FIG. 22 illustrates the display information item of the activity application that is clipped by the window.

DESCRIPTION OF EMBODIMENTS

A. Premise Technique

[A-1. OS for PCs]

Figure 1:
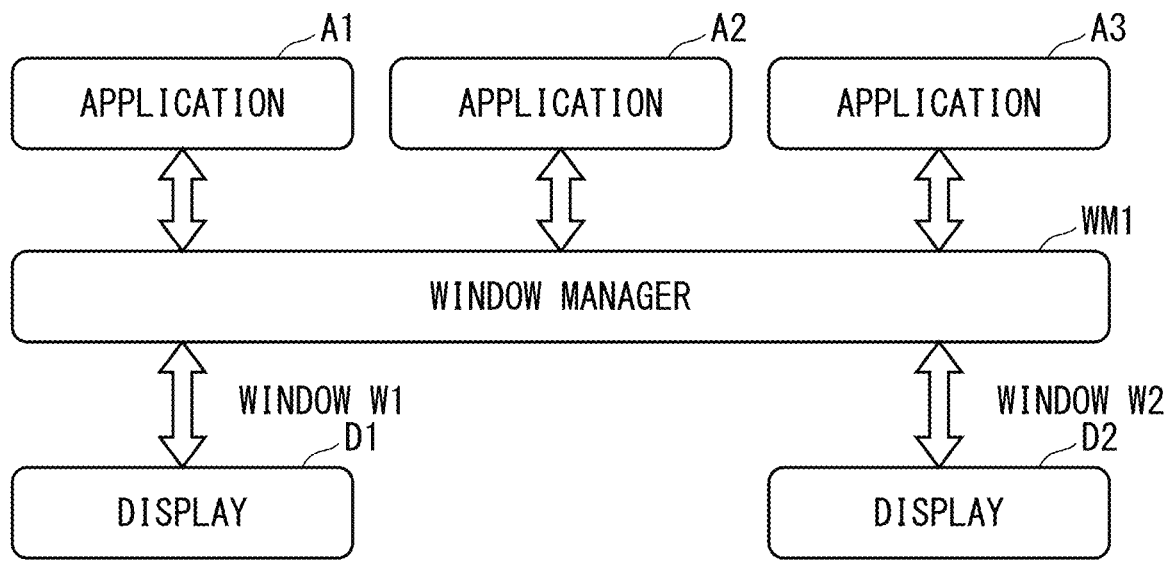
FIG. 1 illustrates a configuration of a display control apparatus that implements multi-display using an OS for personal computers (PCs).

FIG. 1 illustrates a configuration of a display control apparatus that implements multi-display using an OS for PCs. The display control apparatus in FIG. 1 includes two displays D1 and D2, a window manager WM1, and applications A1, A2, and A3.

The applications A1, A2, and A3 include respective display information items for the user. These applications provide the user with information. Alternatively, the applications are operated upon receipt of an instruction from the user. Simultaneous operations of the applications A1, A2, and A3 realize a multi-application.

However, mere use of a multi-application does not allow a multi-window, that is, a plurality of displays to display the display information items of the respective applications.

The window manager WM1 manages and controls windows that are areas for writing the display information items of the applications A1, A2, and A3 to cause the plurality of displays D1 and D2 to display the display information items of the respective applications A1, A2, and A3. The window manager WM1 obtains information on, for example, the screen size from each of the displays D1 and D2, and generates a window W1 for the display D1 and a window W2 for the display D2. Then, the windows W1 and W2 are provided to the applications A1, A2, and A3.

The applications A1, A2, and A3 present the respective display information items to the windows W1 and W2 obtained from the window manager WM1.

Suppose a case where the application A1 presents a display information item to the window W1, the application A3 presents a display information item to the window W2, and the application A2 presents a display information item to the windows W1 and W2. Here, the display information item of the application A2 is located higher with respect to a Z axis of the screen, that is, located more frontward than the display information items of the applications A1 and A3.

Figure 2:
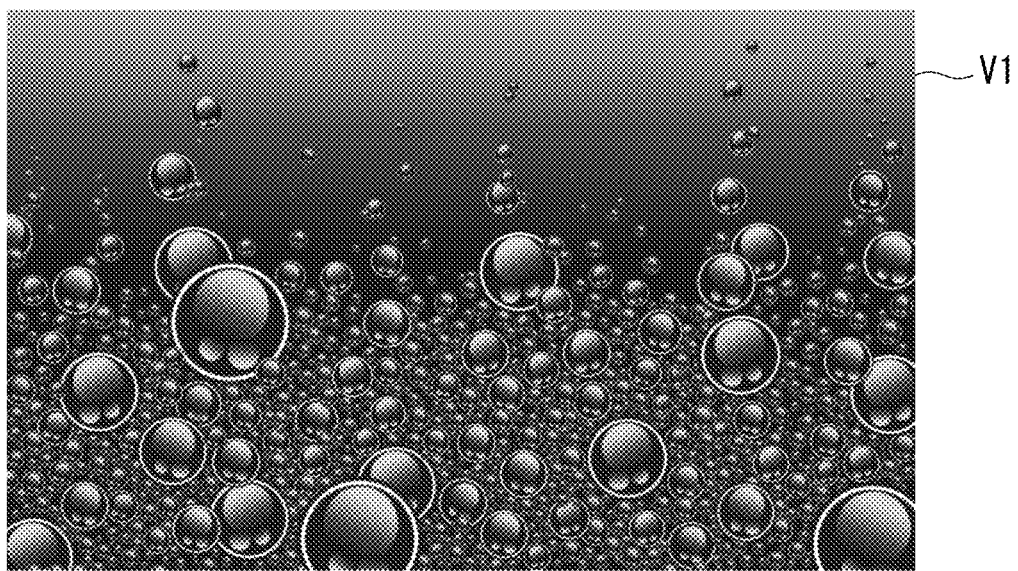
FIG. 2 illustrates a display information item of an application.
Figure 3:
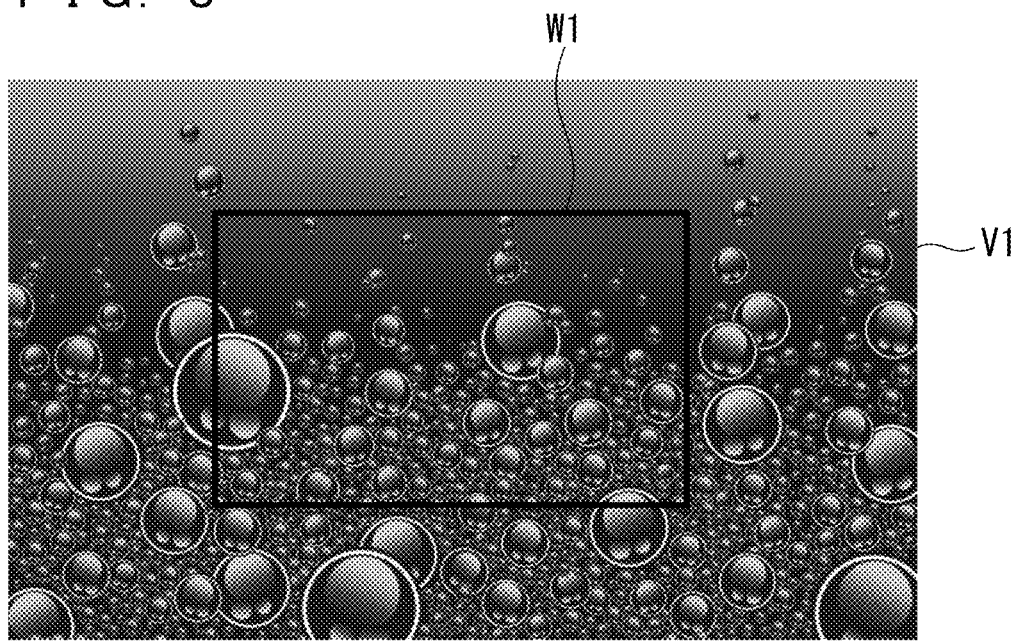
FIG. 3 illustrates a state of clipping the display information item of the application by a window.
Figure 4:
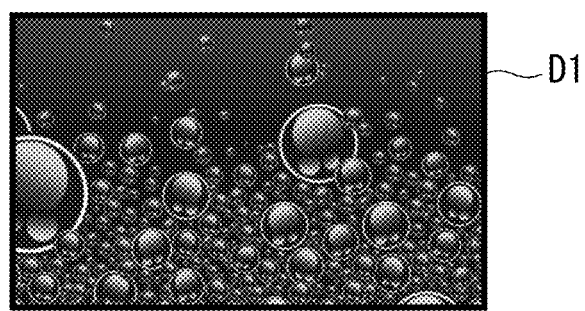
FIG. 4 illustrates a display image of a display.

FIG. 2 illustrates a display information item V1 of the application A1. The window manager WM1 defines which portion of the display information item V1 is clipped by the window W1. FIG. 3 illustrates the display information item V1 and the window W1 that clips a predetermined rectangular area of the display information item V1. Thus, the display information item V1 of the application A1 that is clipped by the window W1 is displayed on the display D1 as illustrated in FIG. 4.

Figure 5:
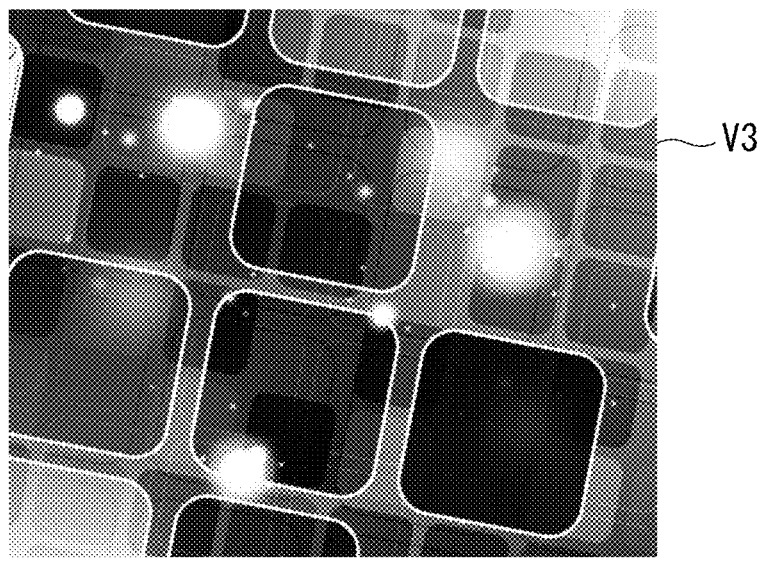
FIG. 5 illustrates a display information item of an application.
Figure 6:
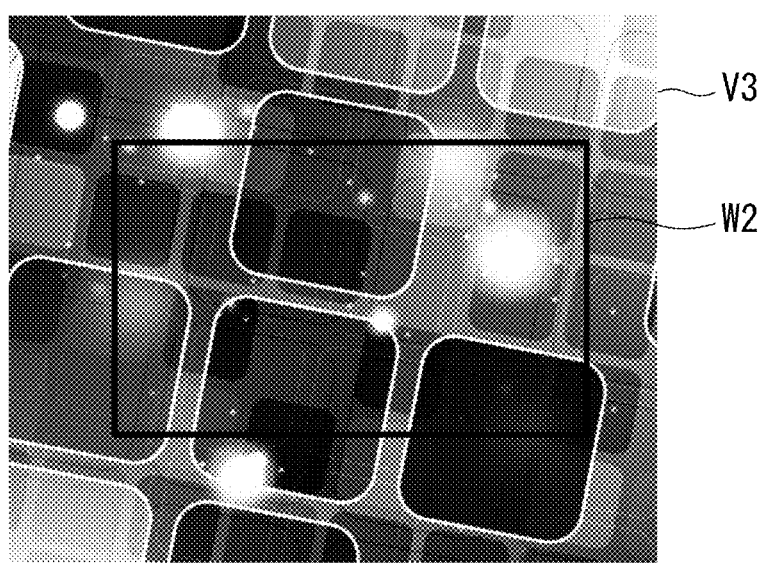
FIG. 6 illustrates a state of clipping the display information item of the application by a window.
Figure 7:
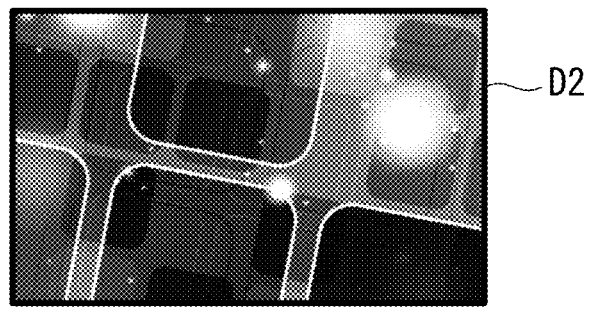
FIG. 7 illustrates the display information item of the application that is clipped by the window.

FIG. 5 illustrates a display information item V3 of the application A3. The window manager WM1 defines which portion of the display information item V3 is clipped by the window W2. FIG. 6 illustrates the display information item V3 and the window W2 that clips a predetermined rectangular area of the display information item V3. Thus, the display information item V3 of the application A3 that is clipped by the window W2 is displayed on the display D2 as illustrated in FIG. 7.

Figure 8:
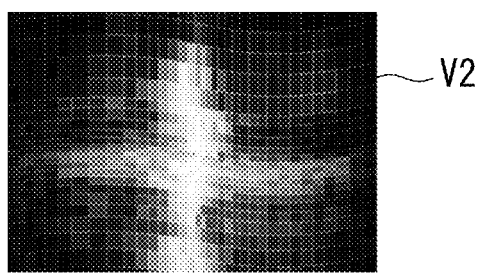
FIG. 8 illustrates a display information item of an application.
Figure 9:
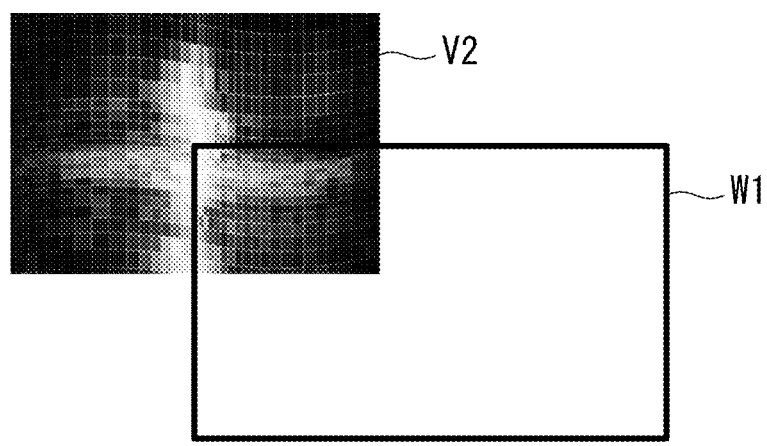
FIG. 9 illustrates a state of clipping the display information item of the application by the window.

FIG. 8 illustrates a display information item V2 of the application A2. The window manager WM1 defines which portion of the display information item V2 is clipped by the window W1. FIG. 9 illustrates the display information item V2 and the window W1 that clips a predetermined rectangular area of the display information item V2. Thus, the display information item V2 of the application A2 that is clipped by the window W1 is displayed on the display D1 as illustrated in FIG. 10.

Figure 11:
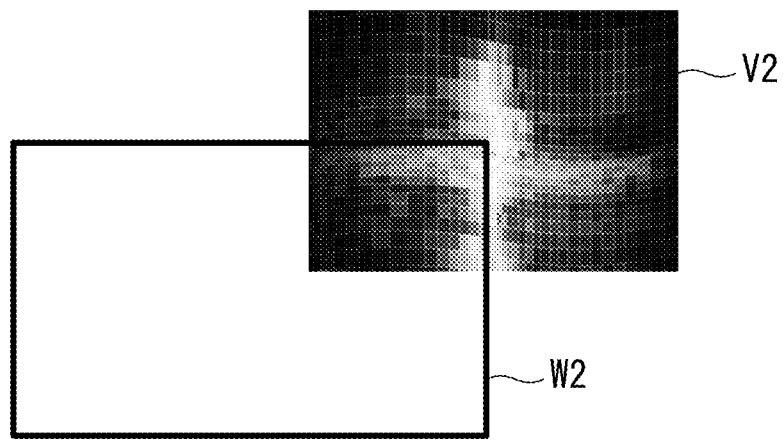
FIG. 11 illustrates a state of clipping the display information item of the application by the window.

The display information item V2 is disposed not only in the window W1 but also in the window W2. The window manager WM1 defines which portion of the display information item V2 is clipped by the window W2. FIG. 11 illustrates the display information item V2 and the window W2 that clips a predetermined rectangular area of the display information item V2. Thus, the display information item V2 of the application A2 that is clipped by the window W2 is displayed on the display D2 as illustrated in FIG. 12.

Figure 10:
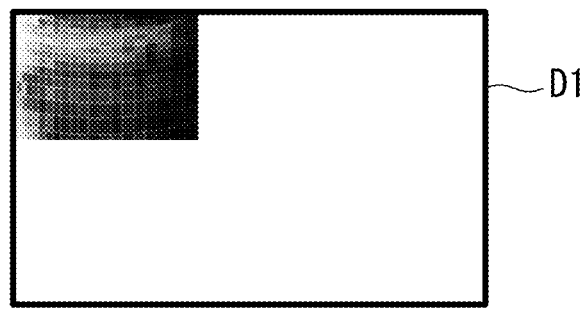
FIG. 10 illustrates the display information item of the application that is clipped by the window.
Figure 13:
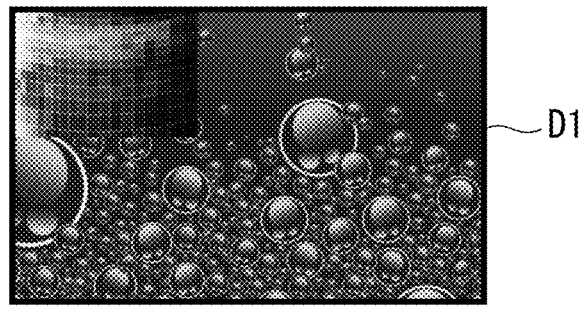
FIG. 13 illustrates a display image of the display.

The display information item V1 illustrated in FIG. 4 and the display information item V2 illustrated in FIG. 10 are displayed on the display D1. Thus, the window manager WM1 actually overlays the display information item V2 on the display information item V1 to cause the display D1 to display the overlaid image as illustrated in FIG. 13. Since the display information item V2 is located higher than the display information item V1 with respect to the Z axis of the screen, the display information item V2 masks the display information item V1 in an upper left area of the display D1.

Figure 12:
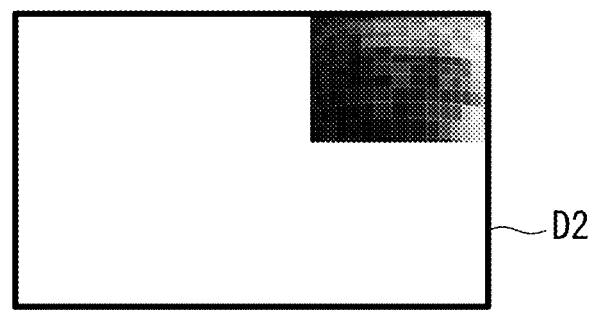
FIG. 12 illustrates the display information item of the application that is clipped by the window.
Figure 14:
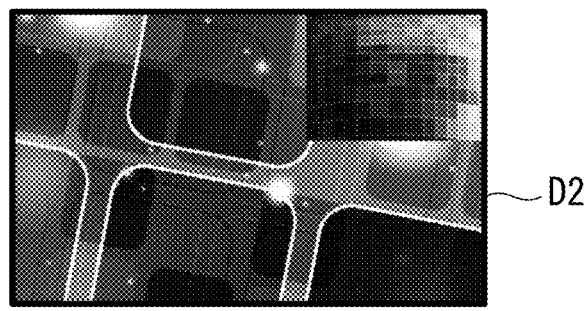
FIG. 14 illustrates a display image of the display.

The display information item V3 illustrated in FIG. 7 and the display information item V2 illustrated in FIG. 12 are displayed on the display D2. Thus, the window manager WM1 actually overlays the display information item V2 on the display information item V3 to cause the display D2 to display the overlaid image as illustrated in FIG. 14. Since the display information item V2 is located higher than the display information item V3 with respect to the Z axis of the screen, the display information item V2 masks the display information item V3 in an upper right area of the display D2.

Since the window manager WM1 of the OS for PCs can allocate a window of a different display to a different application, multi-display with a multi-application can be implemented.

Figure 15:
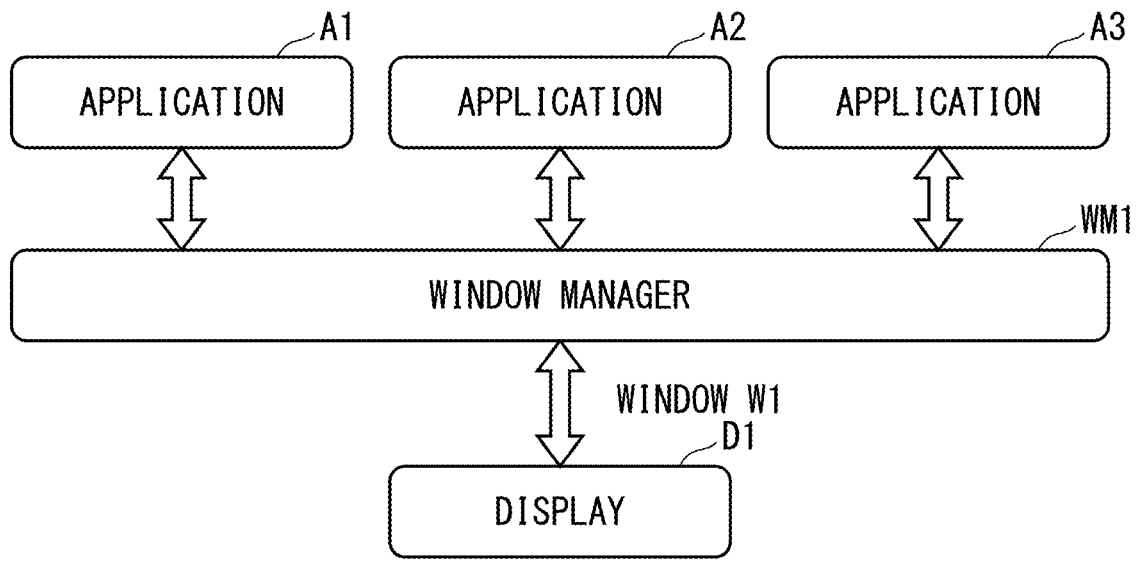
FIG. 15 illustrates a configuration of a display control apparatus that implements a single display using an OS for PCs.

FIG. 15 illustrates a configuration of a display control apparatus that implements a single display using the OS for PCs. The display control apparatus differs from the display control apparatus illustrated in FIG. 1 only in the one display D1. Here, the window W1 of the display D1 is allocated to the applications A1, A2, and A3 and the display information items of the applications A1, A2, and A3 are displayed on the display D1, similarly as the display control apparatus illustrated in FIG. 1.

[A-2. Android (Registered Trademark)]

Figure 16:
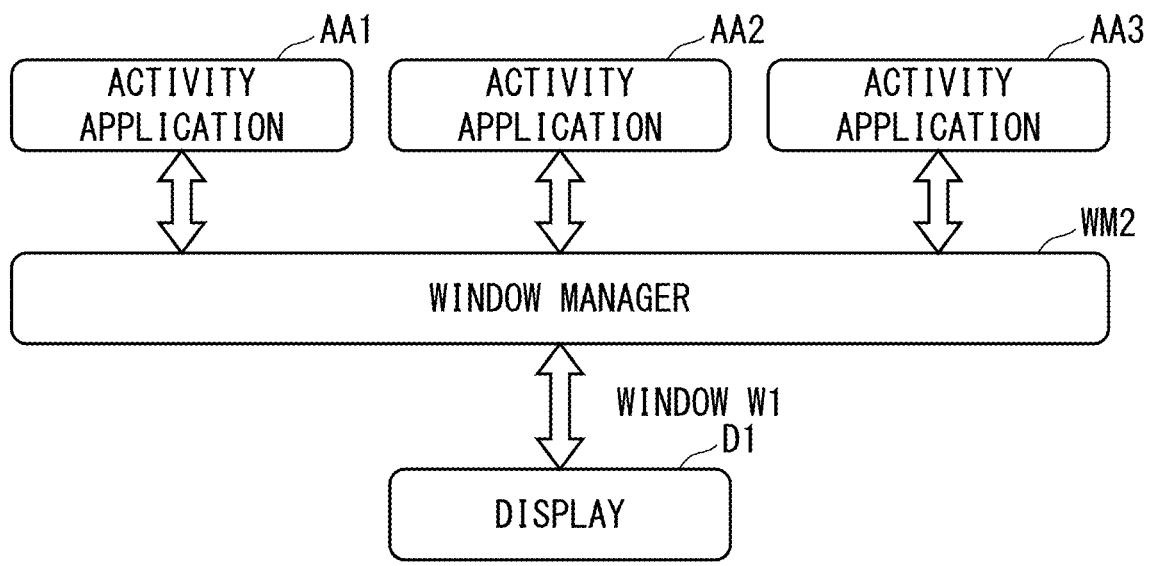
FIG. 16 illustrates a configuration of a display control apparatus that implements a single display using an Android OS.

FIG. 16 illustrates a configuration of a display control apparatus that implements a single display using Android (registered trademark) that is an OS for smartphones. Applications under Android (registered trademark) include activity applications each with a display information item, and service applications without any display information item. The display control apparatus in FIG. 16 includes a window manager WM2, the display D1, and activity applications AA1, AA2, and AA3. The window manager WM2 allocates the window W1 of the display D1 to the activity applications AA1, AA2, and AA3 to cause the display D1 to display the display information items of the activity applications AA1, AA2, and AA3.

Figure 17:
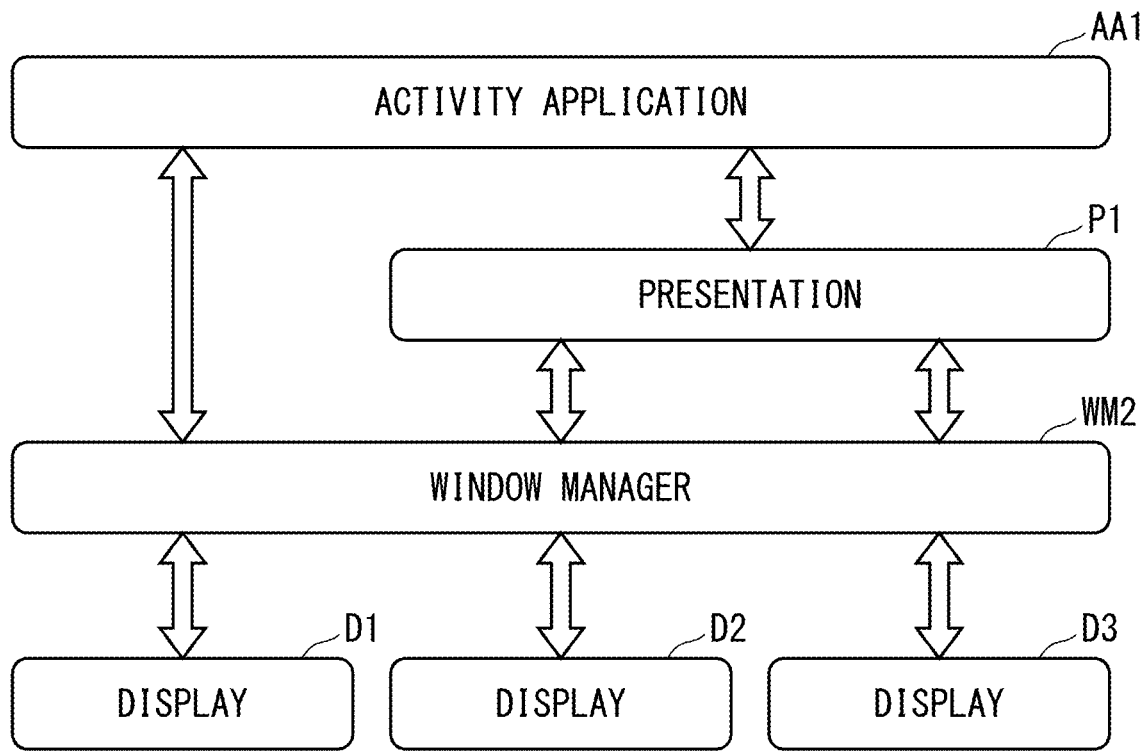
FIG. 17 illustrates a configuration of a display control apparatus that implements multi-display using the Android OS.

FIG. 17 illustrates a configuration of a display control apparatus that implements multi-display using Android (registered trademark) that is the OS for smartphones. The display control apparatus in FIG. 17 includes displays D2 and D3 and a presentation P1, in addition to the configuration of the display control apparatus of FIG. 16. In FIG. 17, the illustration of the activity applications AA2 and AA3 is omitted.

In the display control apparatus of FIG. 17, the window manager WM2 provides the window W1 of the display D1 to the activity applications AA1, AA2, and AA3, and obtains respective display information items of the activity applications AA1, AA2, and AA3 for the window W1. Then, such display information items are overlaid and displayed on the display D1. Among the activity applications AA1, AA2, and AA3, the activity application AA1 is the main application, that is, an application displayed on a foreground.

The presentation P1 is an extended window manager under Android (registered trademark), and allocates windows W2 and W3 of the displays D2 and D3 to the activity application AA1 that is the main activity application among the activity applications AA1, AA2, and AA3. Specifically, the window manager WM2 sends the windows W2 and W3 to the presentation P1, and the presentation P1 sends the windows W2 and W3 to the activity application AA1. Then, the presentation P1 obtains the display information items for the windows W2 and W3 from the activity application AA1, and sends the display information items to the window manager WM2. Thus, the display information items of the activity application AA1 are displayed on the displays D2 and D3.

Figure 18:
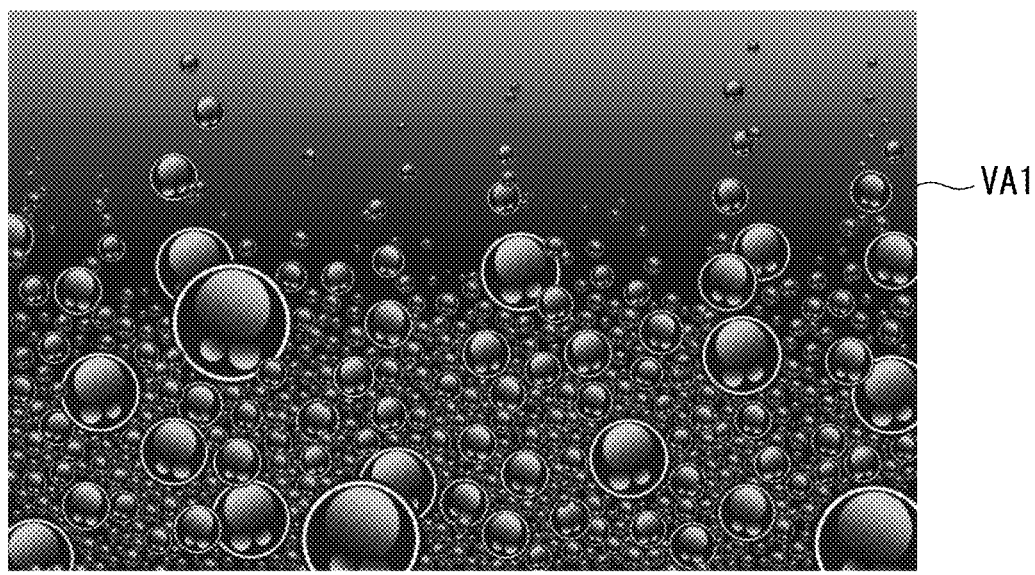
FIG. 18 illustrates a display information item of an activity application.
Figure 19:
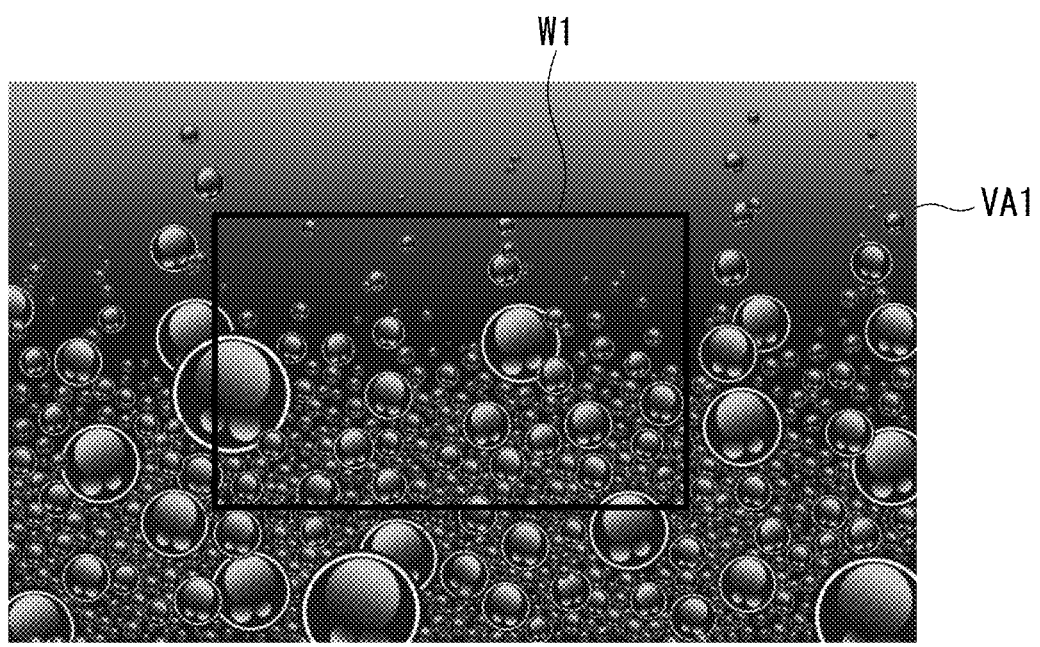
FIG. 19 illustrates a state of clipping the display information item of the activity application by the window.
Figure 20:
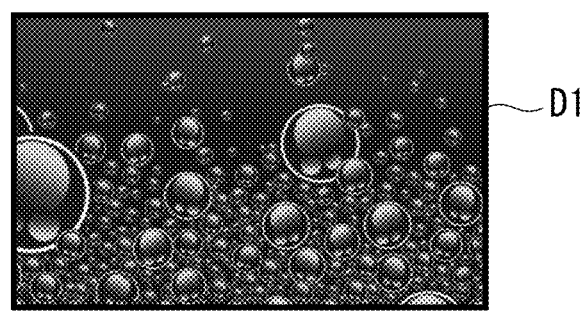
FIG. 20 illustrates the display information item of the activity application that is clipped by the window.

FIG. 18 illustrates a display information item VA1 of the activity application AA1 for the window W1. The window manager WM2 defines which portion of the display information item VA1 is clipped by the window W1. FIG. 19 illustrates the display information item VA1 and the window W1 that clips a predetermined rectangular area of the display information item VA1. Thus, the display information item VA1 of the application AA1 that is clipped by the window W1 is displayed on the display D1 as illustrated in FIG. 20. Although the display information items of the activity applications AA2 and AA3 are displayed on the display D1, the illustration is omitted herein.

The window manager WM2 also defines which portion of the display information item VA1 is clipped by the window W2. FIG. 21 illustrates the display information item VA1 of the activity application AA1 for the window W2, and the window W2 that clips a predetermined rectangular area of the display information item VA1. Thus, the display information item VA1 of the application AA1 that is clipped by the window W2 is displayed on the display D2 as illustrated in FIG. 22.

Figure 23:
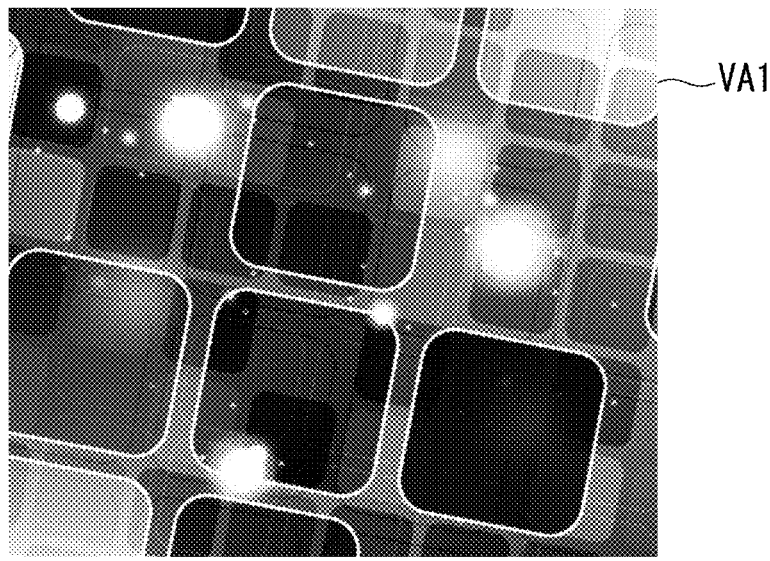
FIG. 23 illustrates a display information item of the activity application.
Figure 24:
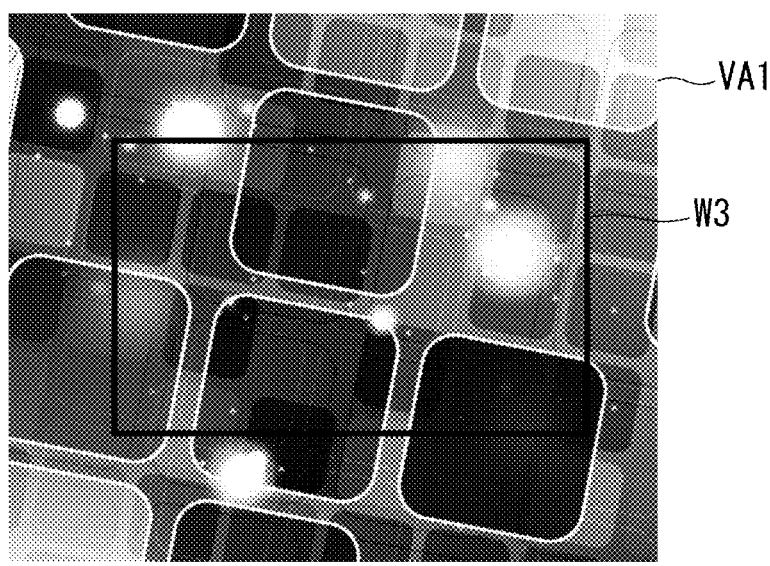
FIG. 24 illustrates a state of clipping the display information item of the activity application by a window.
Figure 25:
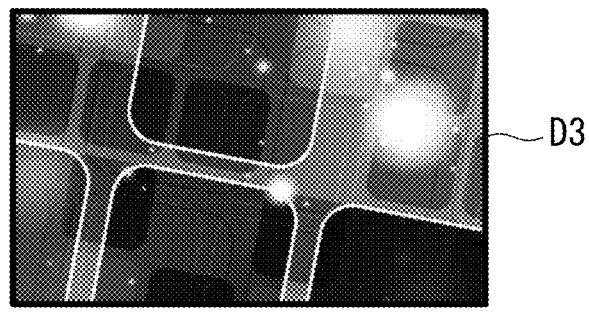
FIG. 25 illustrates the display information item of the activity application that is clipped by the window.

FIG. 23 illustrates the display information item VA1 of the activity application AA1 for the window W3. This display information item VA1 is different from that of the activity application AA1 for the window W1 that is illustrated in FIG. 18. Thus, a plurality of display information items can be prepared per window for the activity application AA1. The window manager WM2 defines which portion of the display information VA1 is clipped by the window W3. FIG. 24 illustrates the display information item VA1 and the window W3 that clips a predetermined rectangular area of the display information item VA1. Thus, the display information item VA1 of the activity application AA1 that is clipped by the window W3 is displayed on the display D3 as illustrated in FIG. 25.

Consequently, the display information item of the activity application AA1 is displayed on the displays D1, D2, and D3 to implement multi-display. However, the window manager WM2 has a constraint of being unable to allocate only one window to one activity application, unlike the window manager WM1 of the OS for PCs. As described above, although the presentation P1 can allocate the windows W2 and W3 to the activity application AA1, the presentation P1 cannot allocate the windows W2 and W3 to the activity applications AA2 and AA3 that are not the main activity applications. Thus, the display information items of the activity applications AA2 and AA3 cannot be displayed on the displays D2 and D3. Switching the main activity application from the activity application AA1 to the activity applications AA2 and AA3 creates inconveniences of failing to cause the displays D2 and D3 to display the display information item of the activity application AA1. Thus, the display information items of a plurality of activity applications cannot be displayed on a plurality of displays.

B. Embodiment 1

[B-1. Configuration]

Figure 26:
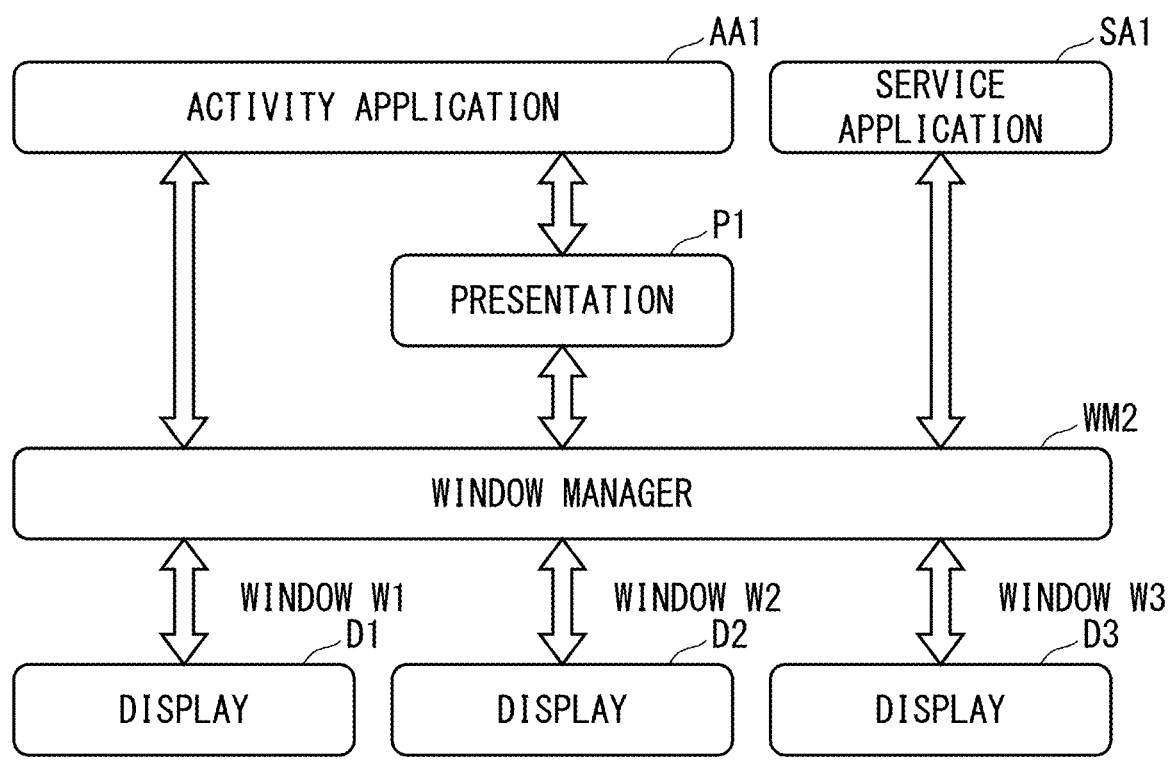
FIG. 26 illustrates a configuration of a display control apparatus according to the present invention.

FIG. 26 is a block diagram illustrating a configuration of a display control apparatus according to Embodiment 1 of the present invention. This display control apparatus implements multi-display using Android (registered trademark) that is an OS for smartphones.

The display control apparatus according to Embodiment 1 includes the window manager WM2, displays D1, D2, and D3, the presentation P1, an activity application AA1, and a service application SA1.

The window manager WM2 and the presentation P1 are functions prepared for Android. Applications under Android are classified into activity applications (first applications) that are applications for controlling display, and service applications (second applications) that are applications for not controlling display. The activity applications are launched (a create state), and start an operation (a start state). The activity applications are in a resume state when coming to the foreground of a window. Once coming out of the foreground, the activity applications pause (a pause state). When there is no necessity of operations as applications, the activity applications come to a stop state. When the activity applications are resumed from the stop state (a restart state), they switch from the start state to the resume state. When the activity applications completely finish the operations, they switch from the stop state to a destroy state. In other words, the activity applications change its application state according to a state of display. In contrast, the service applications (not originally generating any display information item) for not controlling display are the same as the activity applications in launching (the create state) and starting an operation (the start state). However, the service applications do not change its application state according to a state of display. During operations, the service applications continue to operate and never come to the pause state or the stop state. Thus, the service applications never come to the restart state or the resume state, either.

The window manager WM2 creates, for each of the displays D1, D2, and D3, a window that is a display area, and allocates the windows to the activity application AA1 and the service application SA1. Then, the window manager WM2 obtains the display information items from the activity application AA1 and the service application SA1, and causes the displays D1, D2, and D3 corresponding to the respective windows to display the display information items according to the allocation of the windows. In other words, the window manager WM2 functions as: a window creator that creates a window for each of the displays D1, D2, and D3; a window allocator that allocates the windows to a plurality of applications; and a display controller that causes the displays to display the display information items according to the allocation of the windows.

The characteristic herein is that the window manager WM2 allocates windows not only to the activity application AA1 but also to the service application SA1. Specifically, the window manager WM2 allocates the window W1 to the activity application AA1, and the window W3 to the service application SA1. The window manager WM2 also allocates the window W2 to the activity application AA1 through the presentation P1. Since the service application SA1 obtains the window W3 directly from the window manager WM2 without through the presentation P1, the service application SA1 can obtain the window W3 without being constrained by the presentation P1. There is no need to change the configuration of the window manager WM2 and the presentation P1 in the display control apparatus of FIG. 17.

Figure 27:
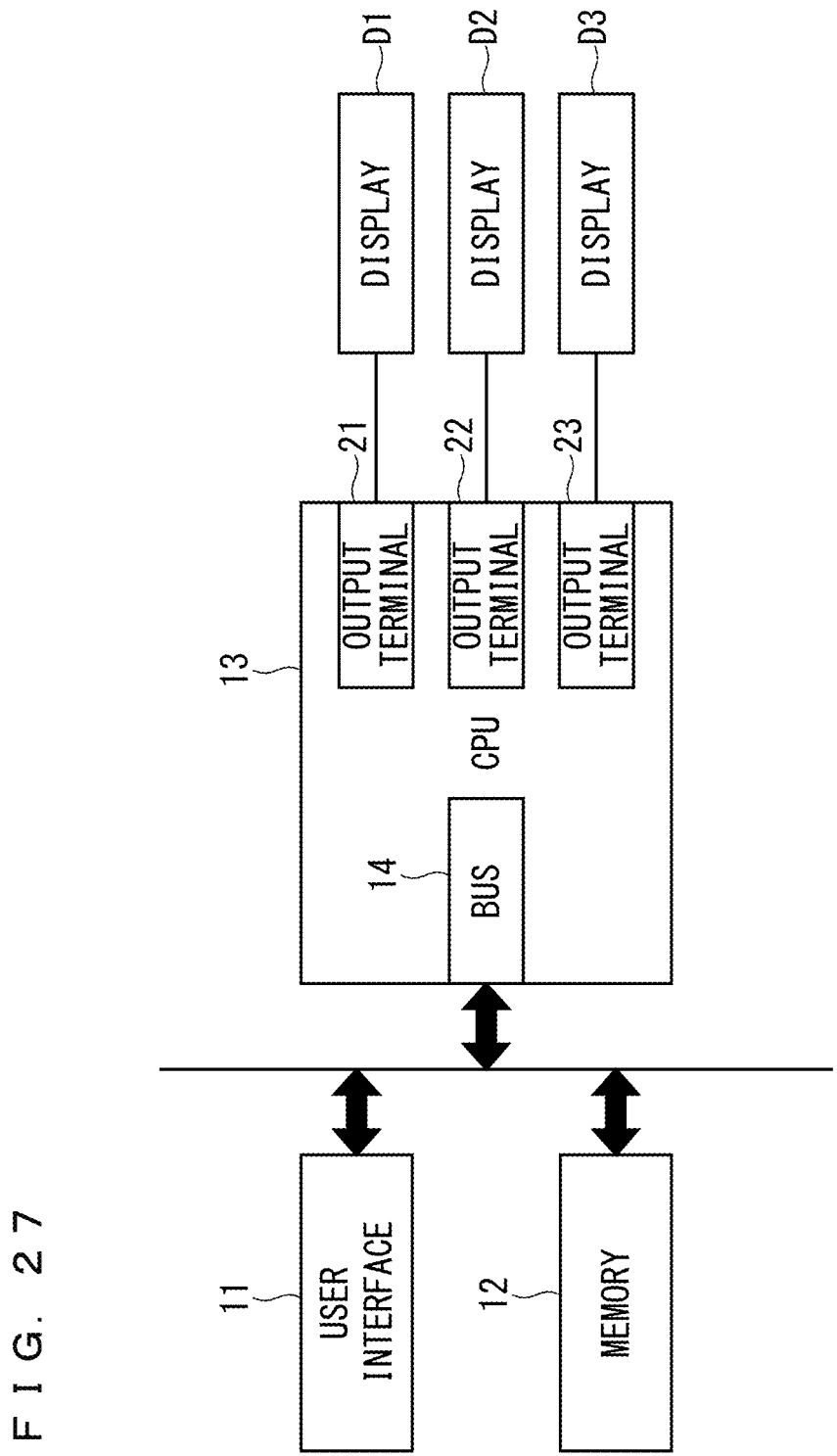
FIG. 27 illustrates a software configuration of the display control apparatus according to the present invention.

FIG. 27 illustrates a hardware configuration of the display control apparatus according to Embodiment 1. The display control apparatus includes a user interface 11, a memory 12, a central processing unit (CPU) 13, and the displays D1, D2, and D3. The CPU 13 is connected to the displays D1, D2, and D3 through output terminals 21, 22, and 23 included in the CPU 13, respectively. The CPU 13 is also connected to the user interface 11 and the memory 12 through a bus 14 included in the CPU 13.

The window manager WM2 (the window creator, the window allocator, and the display controller), the presentation P1, the activity application AA1, and the service application SA1 that are included in the configuration of the display control apparatus illustrated in FIG. 26 are realized by causing the CPU 13 to execute a software program stored in the memory 12.

[B-2. Operations]

Figure 28:
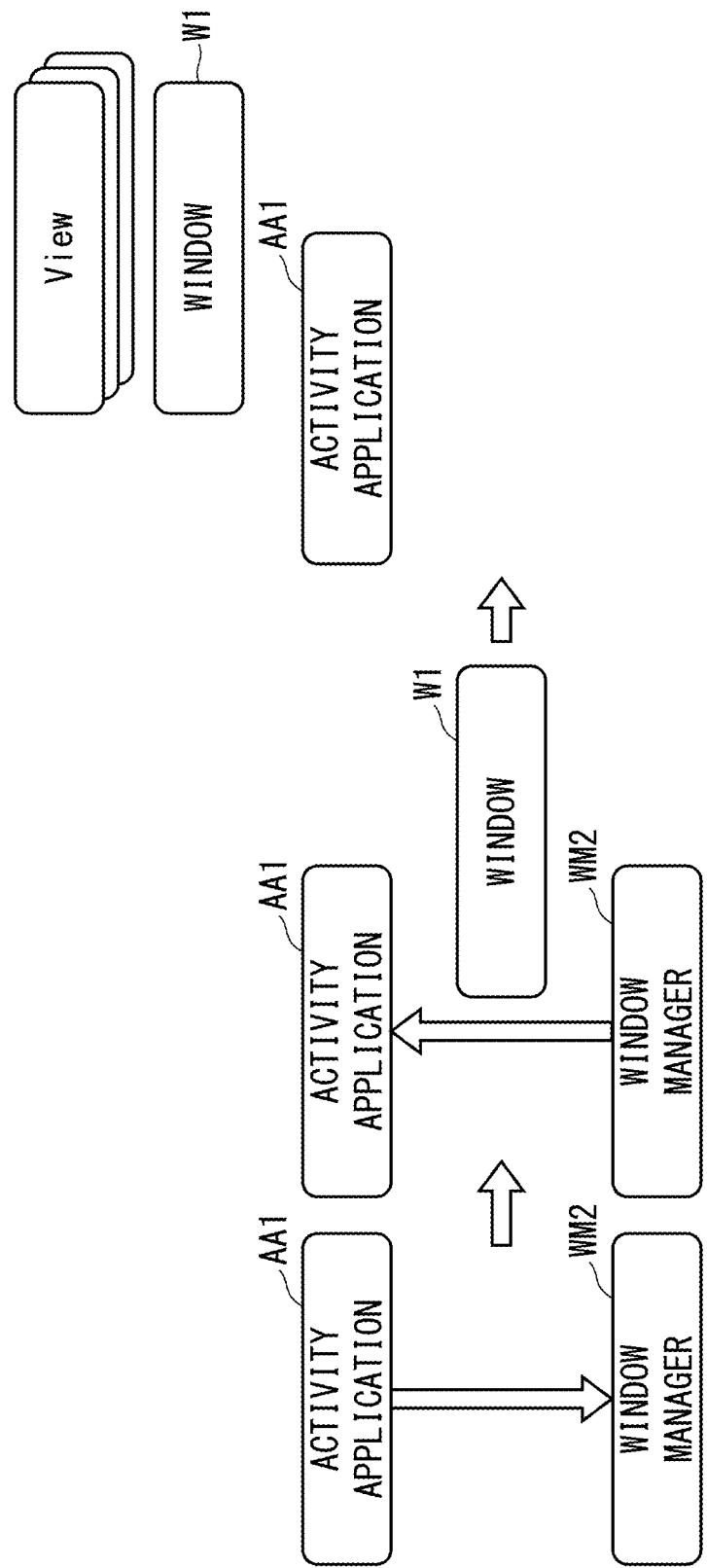
FIG. 28 illustrates a method in which the activity application generates a display information item.

FIG. 28 illustrates a method in which the activity application AA1 generates a display information item. The activity application AA1 requests the window manager WM2 to obtain the window W1. In response, the window manager WM2 sends the window W1 to the activity application AA1. The activity application AA1 that has obtained the window W1 calls a view function, and arranges display components to generate the display information item. The view function is a function prepared for Android.

Figure 29:
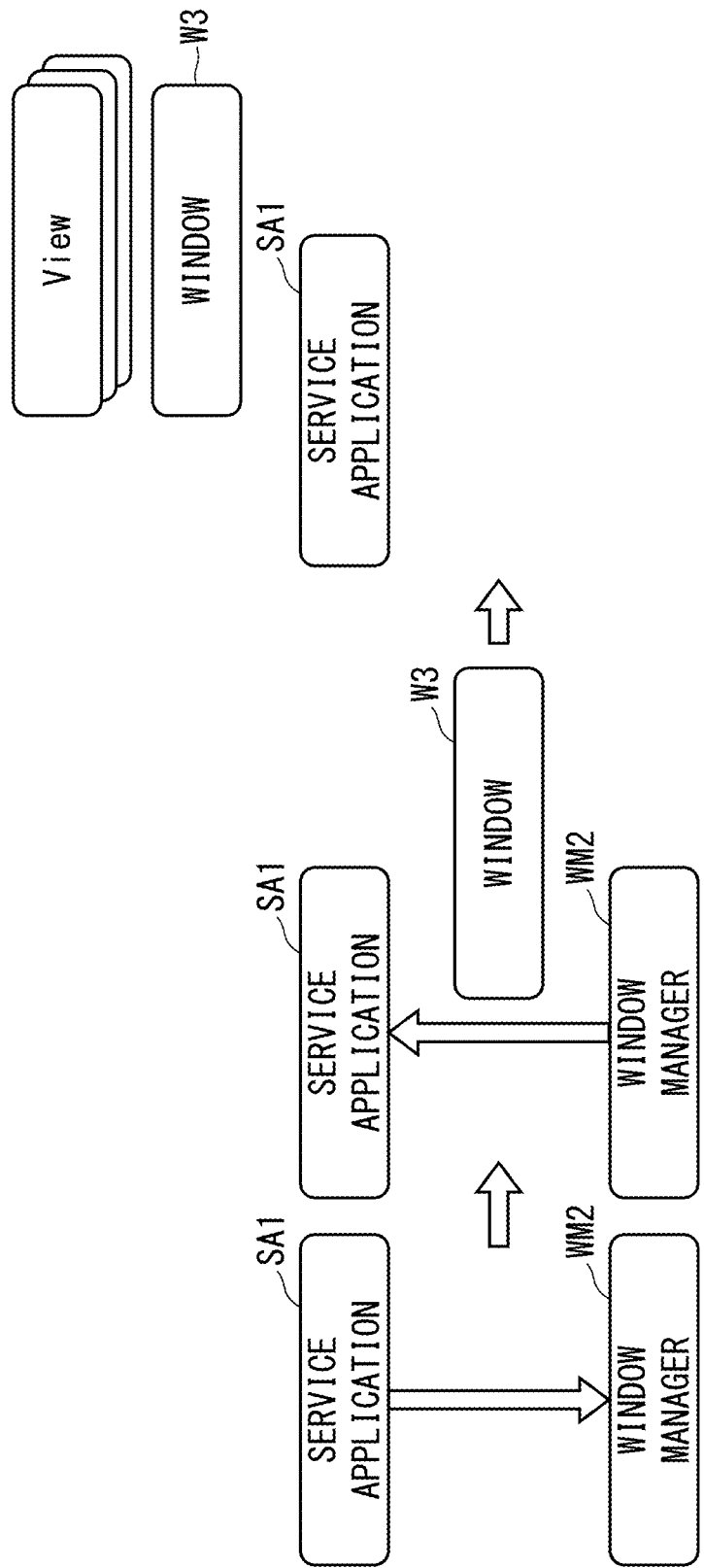
FIG. 29 illustrates a method in which a service application generates a display information item.

FIG. 29 illustrates a method in which the service application SA1 generates a display information item. The service application SA1 requests the window manager WM2 to obtain the window W3. In response, the window manager WM2 sends the window W3 to the service application SA1. The service application SA1 that has obtained the window W3 calls the view function, and arranges display components (views) to generate the display information item. Under the specification of Android (registered trademark), the activity applications (the first applications) are defined as applications for controlling display, whereas the service applications (the second applications) are defined as applications for not controlling display. However, the Applicant has found that the service applications can call the view function and generate a display information item similarly as the activity applications.

As described in FIG. 17, the window manager WM2 can allocate only one window to one activity application, and allocate a plurality of windows only to the main activity application, even using the presentation P1. In other words, the window allocator of the window manager WM2 can allocate only one window to an activity application that does not mainly operate among the activity applications (the first applications). However, a plurality of windows are arranged for a plurality of applications through performing display not only with the activity applications but also with the service applications to implement multi-display. Although FIG. 26 illustrates only one service application, it is actually possible to prepare a plurality of service applications and allocate a different window to each of the service applications. Thus, multi-display having no limitation in the number of windows becomes possible.

Figure 30:
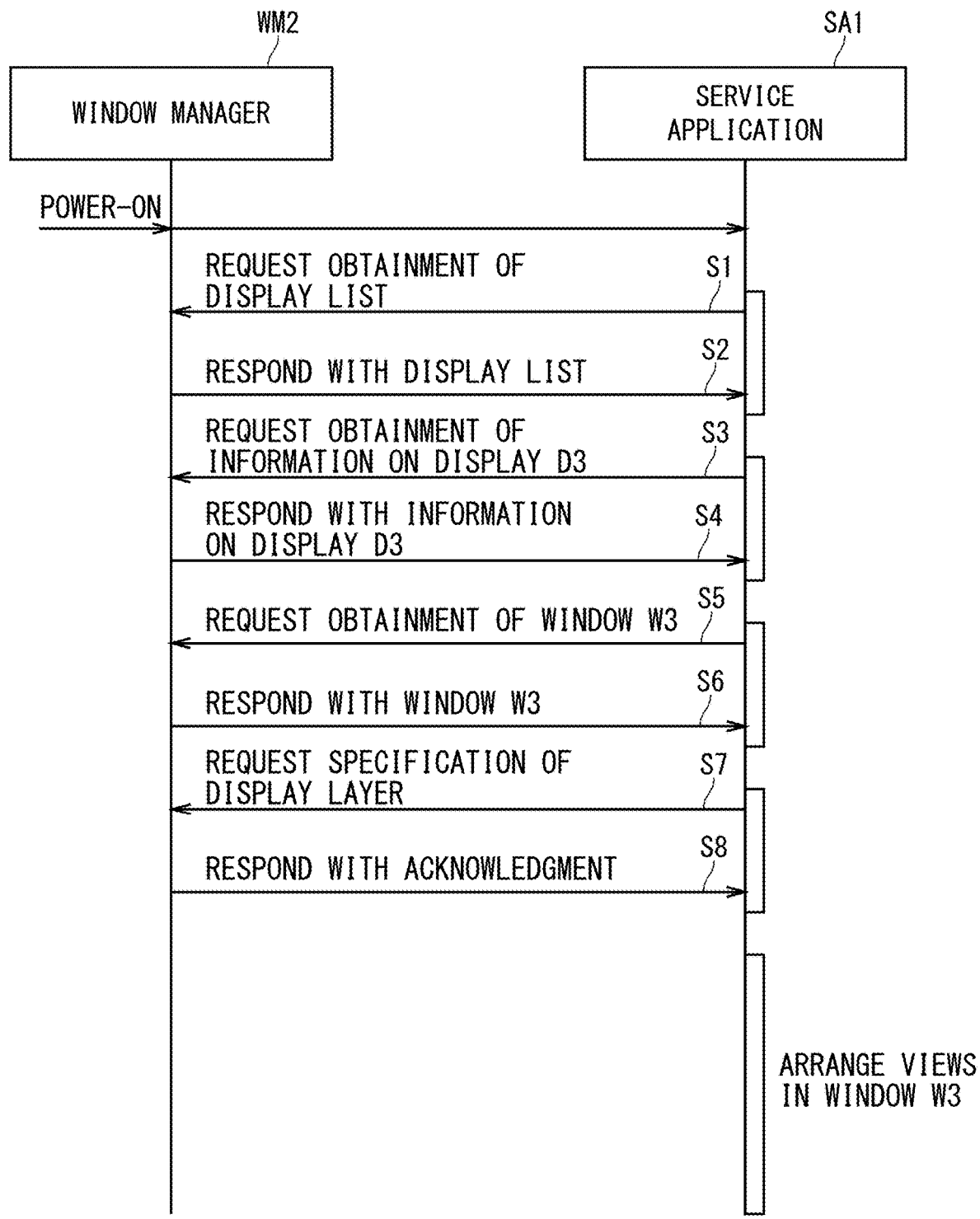
FIG. 30 is a time chart illustrating operations of the display control apparatus according to the present invention.

FIG. 30 is a time chart illustrating a method in which the service application SA1 generates a display information item. Upon power-on of the window manager WM2, the window manager WM2 notifies it to the service application SA1. Then, the service application SA1 requests the window manager WM2 to obtain a display list (Step S1).

The window manager WM2 provides the display list to the service application SA1 in response to this obtainment request (Step S2). Here, the display list includes lists of the displays D1, D2, and D3. Upon receipt of the display list, the service application SA1 requests the window manager WM2 to obtain information on the display D3 (Step S3).

The window manager WM2 provides the information on the display D3 to the service application SA1 in response to this obtainment request (Step S4). Upon receipt of the information on the display D3, the service application SA1 requests the window manager WM2 to obtain the window W3 (Step S5).

The window manager WM2 provides the window W3 to the service application SA1 in response to this obtainment request (Step S6). The window W3 is allocated to the service application SA1 accordingly. Upon receipt of the window W3, the service application SA1 requests the window manager WM2 to specify a display layer (Step S7).

The window manager WM2 responds to the service application SA1 with acknowledgment, in response to this specification request (Step S8). The display layer of the service application SA1 is determined accordingly. Then, the service application SA1 calls the view function, and arranges display components (views) to generate a display information item. This display information item is sent to the window manager WM2, and the window manager WM2 causes the display D3 to display the display information item.

Figure 31:
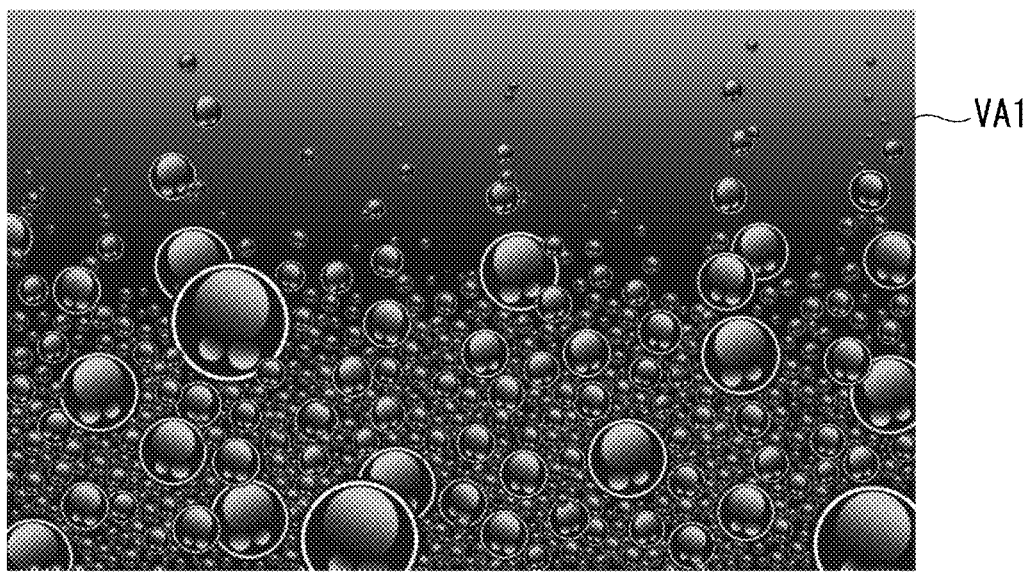
FIG. 31 illustrates a display information item of the activity application.
Figure 32:
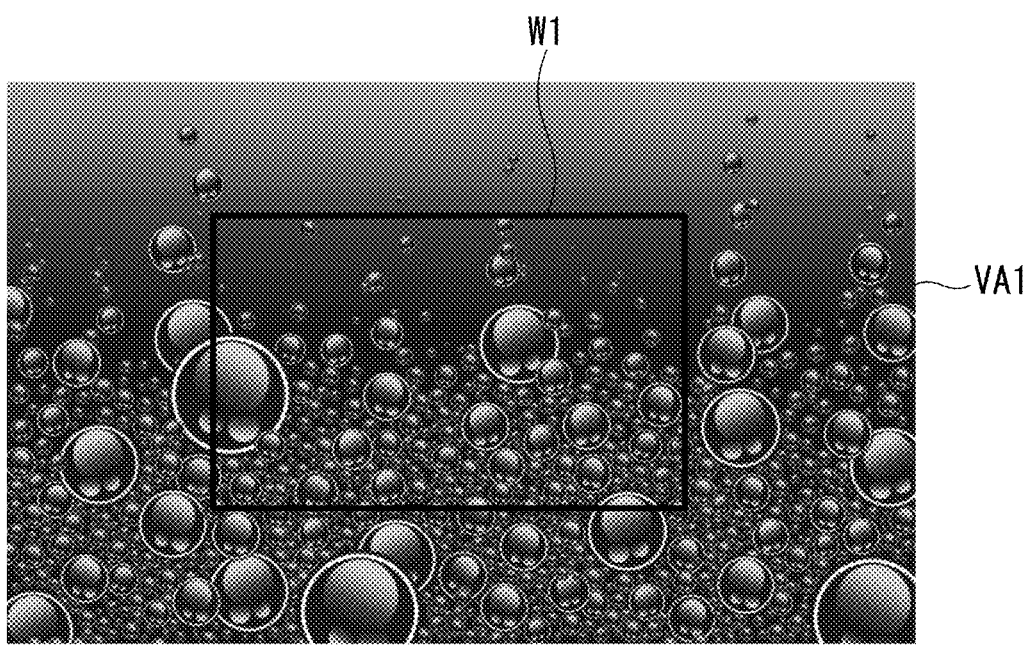
FIG. 32 illustrates a state of clipping the display information item of the activity application by the window.
Figure 33:
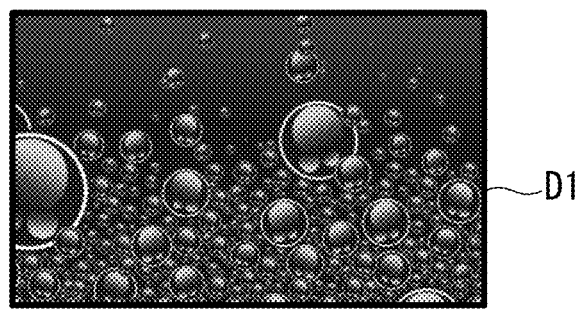
FIG. 33 illustrates the display information item of the activity application that is clipped by the window.

FIG. 31 illustrates the display information item VA1 of the activity application AA for the window W1. The window manager WM2 defines which portion of the display information VA1 is clipped by the window W1. FIG. 32 illustrates the display information item VA1 and the window W1 that clips a predetermined rectangular area of the display information item VA1. Thus, the display information item VA1 of the activity application AA1 that is clipped by the window W1 is displayed on the display D1 as illustrated in FIG. 33.

Figure 34:
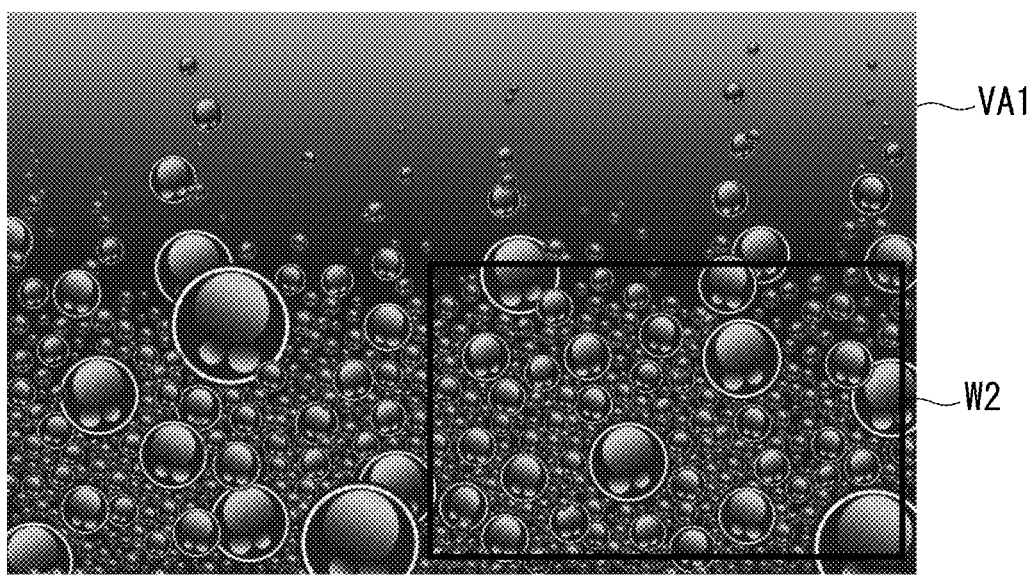
FIG. 34 illustrates a state of clipping the display information item of the activity application by the window.
Figure 35:
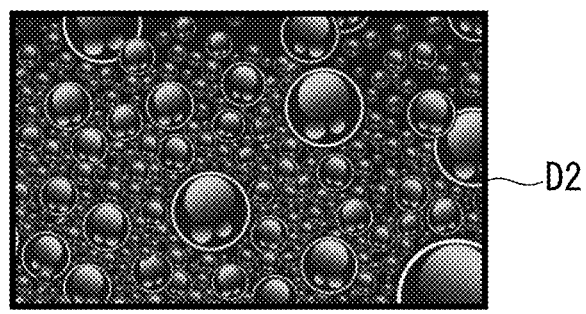
FIG. 35 illustrates the display information item of the activity application that is clipped by the window.

The window manager WM2 defines which portion of the display information VA1 is clipped by the window W2. FIG. 34 illustrates the display information item VA1 of the activity application AA1 for the window W2, and the window W2 that clips a predetermined rectangular area of the display information item VA1. Thus, the display information item VA1 of the activity application AA1 that is clipped by the window W2 is displayed on the display D2 as illustrated in FIG. 35.

Figure 36:
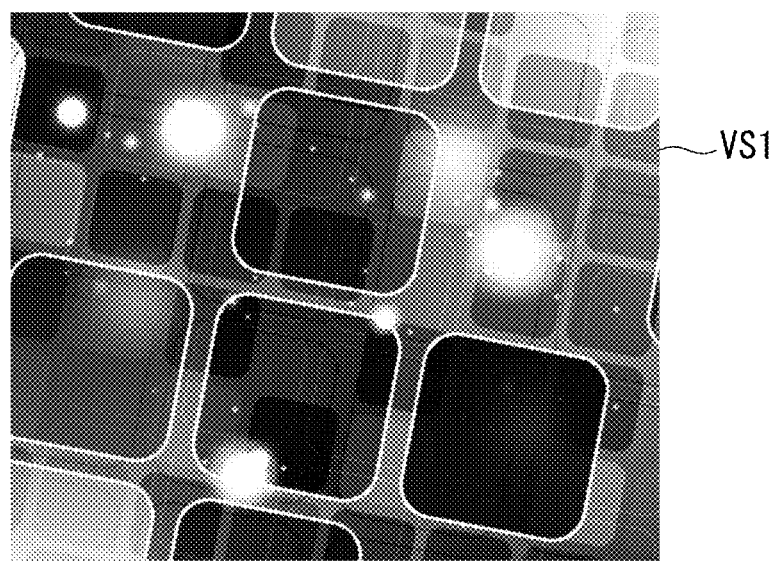
FIG. 36 illustrates a display information item of the service application.
Figure 37:
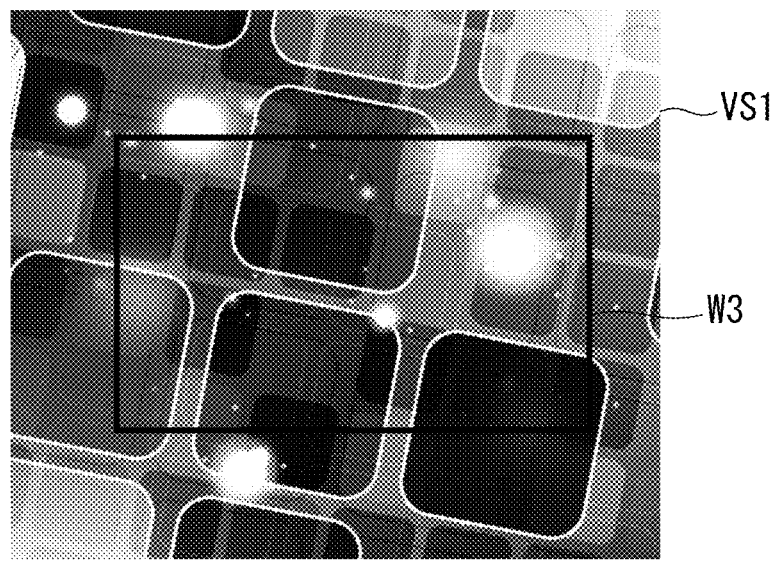
FIG. 37 illustrates a state of clipping the display information item of the service application by the window.
Figure 38:
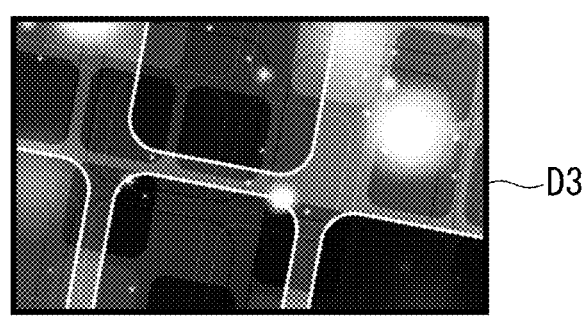
FIG. 38 illustrates the display information item of the service application that is clipped by the window.

FIG. 36 illustrates a display information item VS1 of the service application SA1. For example, quadrilaterals and circles in FIG. 36 are display components. The service application SA1 assigns information indicating scaling, rotation, translation, color, or transparency to each of the quadrilaterals and the circles that are display components, and determines arrangement of the quadrilaterals and the circles on the display information item VS1. The service application SA1 determines the arrangement of the display components. In other words, the service application SA1 determines a layout of the display components on the display information item VS1. The arrangement of the display components requires determinations of coordinates on the display information item VS1. The coordinates include relative coordinates and absolute coordinates. The relative coordinates indicate a relative position relationship involving front and back portions of the other display components. The absolute coordinates indicate a position relationship with respect to the origin of a display information item. Then, the service application SA1 calls the view function, and arranges the display components to generate a display information item. The window manager WM2 defines which portion of the display information item VS1 is clipped by the window W3. FIG. 37 illustrates the display information item VS1 and the window W3 that clips a predetermined rectangular area of the display information item VS1. Thus, the display information item VS1 of the service application SA1 that is clipped by the window W3 is displayed on the display D3 as illustrated in FIG. 38.

In other words, the display control method using an operating system for smartphones according to Embodiment 1 includes: creating, for each of displays, a window that is a display area; allocating the windows to a plurality of applications including first applications defined by a specification of the operating system as applications for controlling display, and second applications defined by the specification of the operating system as applications for not controlling display; causing the plurality of applications to prepare respective display information items; and obtaining the display information items from the plurality of applications, and causing the displays to display the display information items according to the allocating, the displays corresponding to the respective windows. The first applications include an application capable of allocating only one window. Thus, multi-display with a multi-application using the first applications and the second applications can be implemented.

[B-3. Modifications]

Although Android (registered trademark) is exemplified as an operating system for smartphones in the description above, the other operating systems for smartphones are also applicable to the present invention.

It is described that the window manager WM2 sends, for example, the window W1 to the activity application AA1 and that in response to this, the activity application prepares a display information item. However, the window manager WM2 has only to allocate the window W1 to the activity application AA1 and may not send the window W1 itself. Here, the window manager WM2 disposes the display information item obtained from the activity application AA1 in the window W1.

The embodiments of the present invention can be appropriately modified or omitted within the scope of the present invention.

Although this invention has been described in detail, the description is in all aspects illustrative and does not restrict the invention. Therefore, numerous modifications that have yet been exemplified will be devised without departing from the scope of this invention.

EXPLANATION OF REFERENCE SIGNS 11 user interface, 12 memory, 13 CPU, 14 bus, 21, 22, 23 output terminal, A1, A2, A3 application, AA1, AA2, AA3 activity application, D1, D2, D3 display, P1 presentation, WM1, WM2 window manager.

The invention claimed is:

1. A display control apparatus using an operating system for smartphones, said display control apparatus comprising:
a processor to execute a program; and
a memory to store the program which, when executed by the processor, performs processes of
creating, for each of a plurality of display devices, a window that is a display area;
allocating said windows to a first application defined by a specification of said operating system as an application for controlling display, and a second application defined by said specification of said operating system as an application for not controlling display; and
obtaining respective display information items from said first application and said second application, and causing said plurality of display devices to display said display information items according to said allocation of said windows, said display devices corresponding to said respective windows,
wherein said first application is capable of allocating only one window,
said display information item obtained from said first application is partially clipped by said window allocated by said first application and is displayed on a first display device of said plurality of display devices, and
said display information item obtained from said second application is partially clipped by said window allocated by said second application and is displayed on a second display device of said plurality of display devices, and
wherein Android® is used as said operating system,
said first application is an activity application, and
said second application is a service application.

2. The display control apparatus according to claim 1, wherein a view function in said service application prepares a display information item.

3. A display control method using an operating system for smartphones, said display control method comprising:

creating, for each of a plurality of display devices, a window that is a display area;

allocating said windows to a first application defined by a specification of said operating system as an application for controlling display, and a second application defined by said specification of said operating system as an application for not controlling display;

causing said first application and said second application to prepare respective display information items; and obtaining said display information items from said first application and said second application, and causing said display devices to display said display information items according to said allocating of said windows, said display devices corresponding to said respective windows, wherein said first application is an application capable of allocating only one window, said display information item obtained from said first application is partially clipped by said window allocated by said first application and is displayed on a first display device of said plurality of display devices, and said display information item obtained from said second application is partially clipped by said window allocated by said second application and is displayed on a second display device of said plurality of display devices, and wherein Android® is used as said operating system, said first application is an activity application, and said second application is a service application.

* * * * *